June 8, 1954   R. B. SPRAGUE ET AL   2,680,350
HYDRAULIC BRAKE ACTUATOR
Filed July 25, 1949   2 Sheets-Sheet 1

INVENTORS
R. B. SPRAGUE
J. P. ANDERSON
BY William R. Lane
ATTORNEY

June 8, 1954  R. B. SPRAGUE ET AL  2,680,350
HYDRAULIC BRAKE ACTUATOR

Filed July 25, 1949  2 Sheets-Sheet 2

INVENTORS
R. B. SPRAGUE
J. P. ANDERSON

BY William R. Lane

ATTORNEY

Patented June 8, 1954

2,680,350

UNITED STATES PATENT OFFICE 2,680,350

HYDRAULIC BRAKE ACTUATOR

Robert B. Sprague, Long Beach, and John P. Anderson, Topanga, Calif., assignors to North American Aviation, Inc.

Application July 25, 1949, Serial No. 106,528

7 Claims. (Cl. 60—54.6)

This invention relates to hydraulic brake actuator installations, and particularly to boost installations for use in conjunction with hydraulic systems.

It is an object of the present invention to provide means for supplementing the pressure developed manually in a brake system while still retaining an operator sensing characteristic.

It is a further object of the present invention to provide a supplementary powered braking operation which is capable of being operated directly in the event of power failure.

It is still a further object of the present invention to provide a unique power brake unit capable of being connected in series permitting the application of differential braking from a single power source.

Other objects of invention will become apparent from the following description taken in connection with the accompanying drawings, in which Fig. 1 is a schematic arrangement illustrating the present system;

Figure 1:
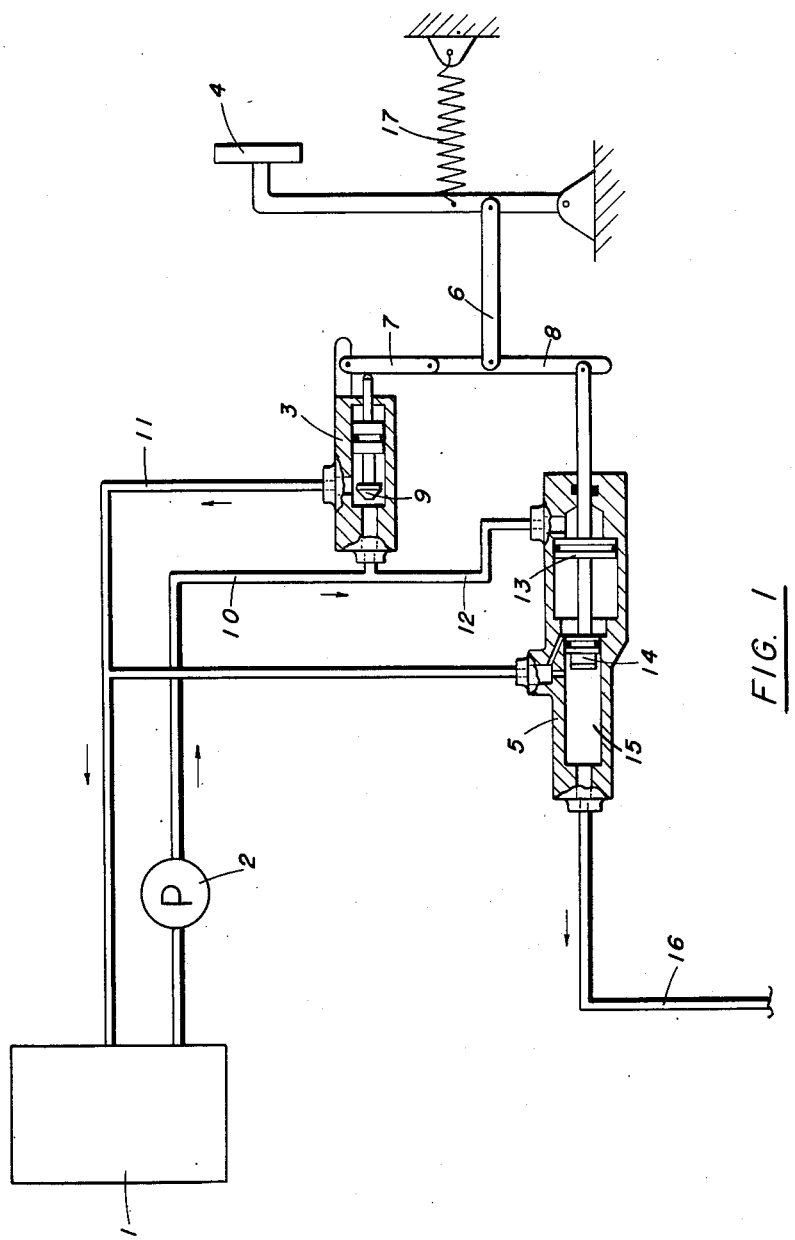

Referring to the arrangement shown in Fig. 1, fluid from a reservoir 1 is circulated by an engine-driven pump 2 through a brake control valve 3 continuously during the operation of the pump. A brake pedal 4 provides a means for applying pressure to the brakes by means of a brake master cylinder 5. The valve 3 and the master cylinder 5 are interconnected with pedal 4 through linkage 6—7—8. The brake master cylinder is supplied with fluid from a common reservoir, appropriate check valves being provided.

When the brakes are to be actuated, an external force on the pedal 4 through the interconnecting linkage tends to move the piston 9 in the valve 3 to the left in Fig. 1 thereby reducing the amount of fluid flowing from the line 10 to the valve 3 and returning through the line 11. The reduced flow of fluid through valve 3 caused by the partial reduction in the size of the valve orifice results in a build-up of the pressure in line 10. The increased fluid pressure in line 10 is applied through line 12 to the right side of piston 13 in the master cylinder. The force on piston 13 resulting from this increased pressure is transmitted to a secondary piston 14. A movement of piston 14 to the left in Fig. 1 closes the check valve and forces fluid from the chamber 15 through the line 16 to the brakes. The fluid pressure acting against the right side of piston 13 will vary in direct proportion to the degree of displacement of piston 9 of the valve 3. If the pump 2 is not in operation, braking action is accomplished directly through the linkage without the power boost. The force on brake pedal 4 is applied by the linkage directly to piston 14, after the movement of the piston 9 in the valve 3 has reached the limit of its travel. A return spring 17 is provided on the pedal to reposition the pistons and linkage.

Figure 2:
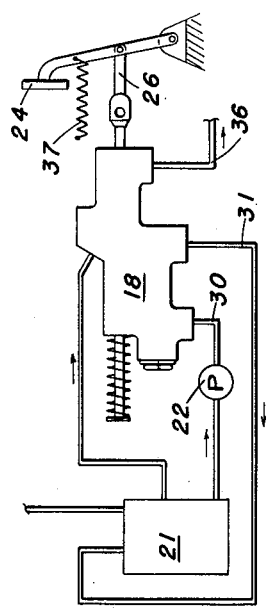
Fig. 2 is a schematic arrangement of a modified type system.

The arrangement shown in Fig. 2 contemplates the substitution of a single unit 18 combining the functions of the valve 3 and master cylinder 5. In this instance fluid is continuously pumped from the reservoir 21 by the motor-driven pump 22 through line 30, unit 18 and back through line 31, to the reservoir.

Figure 3:
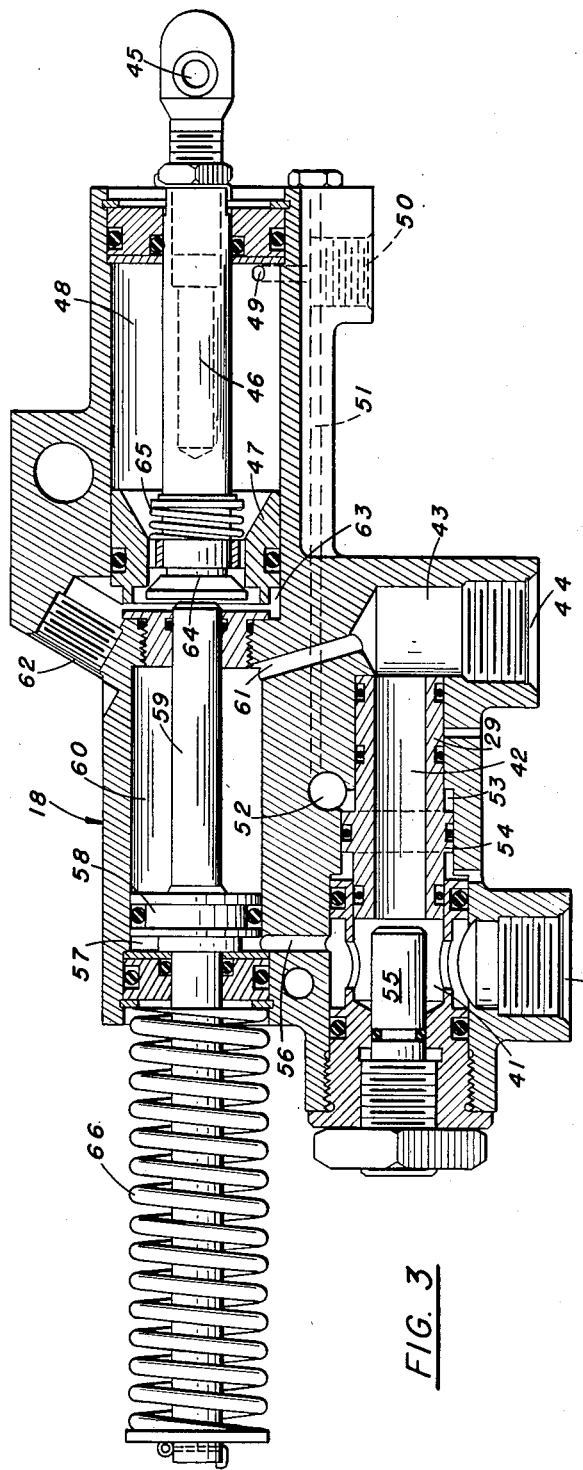
Fig. 3 is a sectional view of the power and control cylinder included in the system shown in Fig. 2.

The details of the unit 18 may be seen in Fig. 3. Lines 30 and 31 of Fig. 2 are connected to inlet port 40 and outlet port 44, respectively, of Fig. 3. Line 36 of Fig. 2 conducts the brake fluid to the brakes and is connected to port 50 of actuator unit 18. Fluid from the engine-driven pump unit enters port 40 from line 30, passing into the chamber 41, through the passage 42, into the chamber 43, and returns through the port 44 via line 31 to the reservoir. The brake pedal linkage 26 of Fig. 2 attaches to coupling 45 of the master cylinder piston rod 46. When brake pedal 24 is actuated by an external force, piston rod 46 and piston assembly 47 move to the right. Movement of the piston assembly 47 to the right tends to displace fluid from the cylinder 48 through the orifice 49 and out the port 50 through line 36 to the brakes.

To supplement the direct pedal pressure in effecting the desired braking action, as the piston 47 displaces fluid through orifice 49, the increased brake fluid pressure is transmitted through a connecting line 51 and through orifice 52 into the chamber 53. The tubular member 29, having central passage 42 though which the fluid from pump 22 circulates continuously, is provided with shoulder 54 against which the fluid pressure in chamber 53 bears. The pressure in chamber 53 is opposed by a constant pressure on the left side of shoulder 54. The member 29 is displaced axially to the left by the increased fluid pressure in chamber 53. Since plug 55 is axially in line with fluid passage 42, the entry to the fluid passage 42 from chamber 41 is a variable orifice the size of which is decreased by the movement to the left of member 29. The pressure drop across the orifice is thereby increased an amount necessary to establish a state of equilibrium of forces acting on tubular member 29. This member 29 moves until the force due to the fluid pressure in chamber 53 is exactly opposed by the force due to the pressure differential between chambers 41 and 43 acting on the ends of member 29. Since the fluid pressure in chamber 57 is maintained continuously equal to the fluid pressure in chamber 41 by means of passage 56, the increased pressure in chamber 41 increases the force on the left face of the piston 58. The fluid pressure in chamber 60 is maintained continuously equal to the pressure in chamber 43 by means of passage 61. Therefore, piston 58 is subjected to the pressure differential across the variable orifice. Any increase in this pressure differential results in a proportionate increase in force on piston 58. Piston 58 moves to the right until a new state of equilibrium of forces on piston 58 is established. The piston in response to this increased pressure differential applies an increased force through the extension pin 59 to the piston rod 46 thereby assisting the pedal effort in displacing fluid from the cylinder 48. The fluid pressure on the left side of piston assembly 47 is maintained constant by a line connecting port 62 to the common reservoir 21.

Piston assembly 47 is subjected to the sum of two actuating forces. The first is the external brake pedal force acting through link 26 and piston rod 46. The second is the hydraulic boost force furnished by piston 58. For any given external force against brake pedal 24 there is a corresponding magnitude of hydraulic boost force. The sum of these two forces is normally opposed by the restoring force due to the subjection of piston assembly 47 to the pressure differential between cylinder 48 and port 62. Any change in the magnitude of the external force against the brake pedal 24 upsets the normal balance between the actuating and restoring forces. New values of pressure differentials immediately establish a new state of equilibrium. Removal of the external force results in the complete return of piston assembly 47 to its unactuated position. Any loss of braking fluid from cylinder 48 or the brake lines is immediately replaced by the action of check valve 64. Check valve 64 remains open as long as the pressure in cylinder 48 is substantially less than the pressure at port 62. Spring 65 assures that check valve 64 reseats when the lost fluid has been replaced. The spring 66 provides a balancing means for the unit preventing a self-energizing effect, dampening oscillatory pressure drop effects between ports 40 and 44. Spring 66 also provides for the return of the piston 58. It is to be noted that the sensitivity and the pressure balance of the unit are governed by the effective areas of piston assembly 47, shoulder 54, and piston 58 and by the adjustment of pin 55 to control the restricting effect on the fluid passing from chamber 41 through passage 42.

Figure 4:
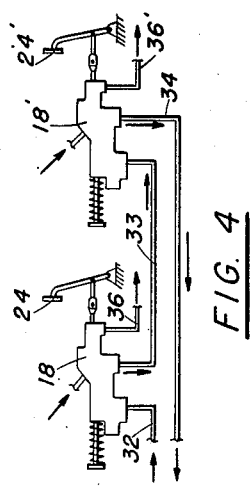
Fig. 4 is a schematic diagram showing a dual installation.

Two or more actuator units 18 may be readily connected in series with a single pressure source and reservoir as shown in Fig. 4. Unit 18 and unit 18' are identical to the unit 18 of Fig. 3. Line 32 connects a pressure source such as pump 22 of Fig. 2 with port 40 of unit 18. Line 33 connects port 44 of unit 18 to port 40 of unit 18'. Line 34 connects port 44 of unit 18' to a reservoir such as reservoir 21 of Fig. 2. Fluid under pressure from the pressure source continuously flows through line 32, unit 18, line 33, unit 18', and line 34 as indicated by the arrows in Fig. 4. Two independent brake pedals 24 and 24' are utilized to furnish separate external forces to each actuator unit. Brake pedal 24 actuates unit 18 to furnish brake fluid under pressure to one braking system through line 36. Brake pedal 24' actuates unit 18' to independently furnish brake fluid under pressure to a second braking system through line 36'. In each of units 18 and 18' the operation of the components is the same as described above for Fig. 3. When an external pedal force is exerted against one of the units in series, there is a pressure drop between chambers 41 and 43 of that unit. This pressure differential is reflected into chambers 57 and 60 of that unit and acts against piston 58 to proportionately boost the external pedal force in furnishing fluid to the brakes controlled by the unit. Since tubular member 29 is designed never to completely close the variable orifice between chamber 41 and passage 42, there is continuous recirculation of the fluid from the pressure source and reservoir to both control valves. Thus, although brake pedal 24 is being operated, brake pedal 24' can be simultaneously operated. Therefore a plurality of hydraulic brake actuators of this invention can readily be used to independently operate a corresponding number of brakes in response to individual external forces although only one pressure source is used. In open center type hydraulic circuits the fluid may thus be circulated through both units from a single power source. Differential braking may accordingly be obtained in a simple and efficient installation.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A hydraulic actuator for supplying fluid under pressure in response to an external force comprising fluid pressure generating means responsive to said external force, variable orifice means, means for continuously circulating fluid through said variable orifice means, differential pressure sensitive means responsive to the pressure differential across said variable orifice means, said differential pressure sensitive means being positioned to aid said external force to actuate said pressure generating means, and actuating means responsive to said external force for varying the size of said variable orifice means whereby the pressure generated by said generating means in response to said external force is proportionally boosted by said differential pressure sensitive means.

2. A hydraulic actuator for supplying fluid under pressure in response to an external force comprising fluid pressure generating means responsive to said external force, variable orifice means, means for continuously circulating fluid through said variable orifice means, a cylinder, a piston adapted to move longitudinally in said cylinder, passages connecting said cylinder across said variable orifice means, means transmitting to said pressure generating means the force generated by said piston in response to the pressure differential across said variable orifice means, and actuating means responsive to said external force for varying the size of said variable orifice means whereby the pressure generated by said generating means in response to said external force is proportionally boosted by the response of said piston to said pressure differential.

3. A hydraulic actuator as recited in claim 2 in which said fluid pressure generating means comprises a second cylinder containing hydraulic fluid, a second piston adapted to move longitudinally in said second cylinder, and means subjecting said piston to said external force.

4. A hydraulic actuator as recited in claim 2 in which said actuating means is a mechanical linkage coupling said variable orifice to said external force.

5. A hydraulic actuating system for independently supplying fluid under pressure through a plurality of pressure systems in response to individual external forces comprising a plurality of fluid pressure penerating means, a corresponding number of variable orifice means, means for continuously circulating fluid through all of said variable orifice means in series, a corresponding number of pressure sensitive means individually responsive to the pressure differential across a corresponding variable orifice means, each of said pressure sensitive means being operatively associated with a corresponding pressure generating means, and actuating means responsive to said individual external forces for independently varying the size of each of said variable orifice means whereby individual fluid pressures generated by said generating means in response to corresponding external forces are independently proportionally boosted by said pressure sensitive means.

6. A hydraulic actuating system as recited in claim 5 in which each of said pressure sensitive means comprises a cylinder, a piston adapted to move longitudinally in said cylinder, means hydraulically connecting said cylinder in parallel with a corresponding variabe orifice means, and means for transmitting to the corresponding pressure generating means the forces acting on said piston in response to pressure differential across said variable orifice means.

7. A hydraulic actuating system as recited in claim 6 in which each of said fluid pressure generating means comprises a second cylinder containing hydraulic fluid, a second piston adapted to move longitudinally in said second cylinder, and means subjecting said piston to one of said external forces.

References Cited in the file of this patent

UNITED STATES PATENTS

| Number | Name | Date |
|---|---|---|
| 1,903,973 | Boughton | April 18, 1933 |
| 1,906,242 | Avery | May 2, 1933 |
| 2,318,756 | Chouings | May 11, 1943 |
| 2,343,698 | Parnell | Mar. 7, 1944 |
| 2,395,223 | Ingres | Feb. 19, 1946 |
| 2,449,392 | Kremiller | Sept. 14, 1948 |
| 2,473,803 | La Brie | June 21, 1949 |